(12) United States Patent
Kohler et al.

(10) Patent No.: US 7,293,408 B2
(45) Date of Patent: Nov. 13, 2007

(54) EXHAUST GAS TREATMENT SYSTEM AND UTILITY VEHICLE WITH AN EXHAUST GAS TREATMENT SYSTEM

(75) Inventors: Gerhard Kohler, Esslingen (DE); Werner Ladenburger, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/199,551

(22) Filed: Aug. 8, 2005

(65) Prior Publication Data
US 2006/0010858 A1 Jan. 19, 2006

Related U.S. Application Data

(63) Continuation-in-part of application No. PCT/EP03/13918, filed on Dec. 9, 2003.

(30) Foreign Application Priority Data
Feb. 7, 2003 (DE) ................. 103 05 057

(51) Int. Cl.
*F01N 3/00* (2006.01)
(52) U.S. Cl. .............. 60/286; 60/283; 60/295; 60/297; 60/303; 180/225
(58) Field of Classification Search ........ 60/272, 60/283, 286, 295, 297, 301, 303, 311; 180/225
See application file for complete search history.

(56) References Cited

U.S. PATENT DOCUMENTS

| 6,199,375 | B1 | 3/2001 | Russell | |
|---|---|---|---|---|
| 6,813,884 | B2 * | 11/2004 | Shigapov et al. | 60/295 |
| 6,820,414 | B2 * | 11/2004 | Stroia et al. | 60/286 |
| 6,826,906 | B2 * | 12/2004 | Kakwani et al. | 60/303 |
| 6,832,473 | B2 * | 12/2004 | Kupe et al. | 60/286 |
| 6,845,610 | B2 * | 1/2005 | Shiino et al. | 60/286 |
| 6,892,529 | B2 * | 5/2005 | Duvinage et al. | 60/286 |

FOREIGN PATENT DOCUMENTS

| DE | 196 36 747 | 3/1998 |
|---|---|---|
| DE | 101 28 414 | 12/2001 |
| WO | WO 01/42633 | 6/2001 |

* cited by examiner

*Primary Examiner*—Binh Q. Tran
(74) *Attorney, Agent, or Firm*—Klaus J. Bach

(57) ABSTRACT

In an exhaust gas treatment system and a utility vehicle having an exhaust gas treatment system, the exhaust gas treatment system includes a particle reduction unit, a reducing agent tank and a nitrogen oxide reduction unit of a modular design, wherein the reducing agent tank is arranged between the particle reduction unit and the nitrogen oxide reduction unit and extends around a connecting line extending between the particle reduction unit and the nitrogen oxide reduction unit, and in a utility vehicle, the associated exhaust gas treatment system is arranged within a predefined cuboid envelope volume on a support structure which is attached to a frame member of the vehicle.

17 Claims, 3 Drawing Sheets

EXHAUST GAS TREATMENT SYSTEM AND UTILITY VEHICLE WITH AN EXHAUST GAS TREATMENT SYSTEM

This is a Continuation-In-Part Application of international application PCT/EP03/13918 filed Dec. 09, 2003 and claiming the priority of German application 103 05 057.4 filed Feb. 07, 2003.

BACKGROUND OF THE INVENTION

The invention relates to an exhaust gas treatment system including a particle removing unit and a nitrogen oxide removing unit disposed in an exhaust duct of an internal combustion engine and a utility vehicle with such an exhaust gas treatment system.

Patent application WO 01/42633 describes an exhaust gas treatment system comprising a plurality of separate units. The exhaust gas treatment system may have, for example, a particle reduction unit and a nitrogen oxide reduction unit. An SCR (=selective catalytic reduction) catalytic converter, which is supplied with urea as a selective reduction agent for the nitrogen oxide, is provided as a nitrogen oxide reduction unit. The exhaust gas treatment system described is mainly considered for use in utility vehicles. The purpose of WO 01/42633 is essentially to provide an advantageous connection between the units of the exhaust gas treatment system. The installation problems which are associated with the installation in a utility vehicle are not considered.

However, as the complexity and size of exhaust gas treatment systems increase with greater demands on exhaust gas cleaning, the installation and arrangement in a corresponding utility vehicle are becoming more difficult. With the arrangement of the units of an exhaust gas treatment system particular attention needs to be given to reliable functioning of the exhaust gas treatment system. Often there are difficulties with the arrangement or accommodation of these units, in particular with respect to the arrangement of other assemblies which are necessary to operate the utility vehicle, for example the fuel tank which usually also has a very large volume.

It is the object of the present invention to provide a compact exhaust gas treatment system for comprehensive and effective treatment of the exhaust gas of a utility vehicle and also to provide a utility vehicle with an exhaust gas treatment system in a favorable and space-saving arrangement.

SUMMARY OF THE INVENTION

In an exhaust gas treatment system and a utility vehicle having an exhaust gas treatment system, the exhaust gas treatment system includes a particle reduction unit, a reducing agent tank and a nitrogen oxide reduction unit of a modular design, wherein the reducing agent tank is arranged between the particle reduction unit and the nitrogen oxide reduction unit and extends around a connecting line extending between the particle reduction unit and the nitrogen oxide reduction unit, and in a utility vehicle, the associated exhaust gas treatment system is arranged within a predefined cuboid envelope volume on a support structure which is attached to a frame member of the vehicle.

In the exhaust gas treatment system according to the invention the nitrogen oxide reduction unit is arranged at a distance from the particle reduction unit and a reducing agent tank is provided for supplying a reducing agent which can be used for reducing the nitrogen oxide and which is arranged between the particle reduction unit and the nitrogen oxide reduction unit. The particle reduction unit, the reducing agent tank and the nitrogen oxide reduction unit are preferably positioned one behind the other in a linear arrangement. The distance between the particle reduction unit and the nitrogen oxide reduction unit is suitably selected or predefined according to the structural conditions and depending on the size and shape of the reducing agent tank.

A particle reduction unit is a physical unit through which exhaust gas from an internal combustion engine is conducted and with which the mass and/or number of particles in the exhaust gas can be reduced. A particle filter is preferably arranged as a particle-reducing unit in the interior of this physical unit. If appropriate further components which have a cleaning effect may be arranged in the physical unit, in particular components which additionally promote the particle reduction or contribute to a regeneration of a particle filter. For example, an oxidation catalytic converter which is preferably connected upstream of the particle filter can be arranged in the particle reduction unit.

A nitrogen oxide reduction unit is a physical unit through which exhaust gas from an internal combustion engine can flow and with which it is possible to bring about a reduction of the nitrogen oxide content of the exhaust gas. A denox catalytic converter, which may be embodied in particular as an SCR catalytic converter, is preferably arranged in the interior of this physical unit.

If appropriate, further components, for example a hydrolysis catalytic converter for preparing urea, may be arranged in the nitrogen oxide reduction unit. In addition, an oxidation catalytic converter, for example for oxidizing ammonia, may be arranged downstream of the denox catalytic converter in the nitrogen oxide reduction unit.

The reducing agent which is stored in the reducing agent tank is preferably a liquid hydrocarbon or a solution of urea and water.

The inventive arrangement of the reducing agent tank between the particle reduction unit and the nitrogen oxide reduction unit provides a space-saving and compact design of the exhaust gas treatment system with short line lengths and a comparatively small effective external surface so that heat losses can be kept small.

The exhaust gas treatment system also attenuates sounds so that under certain circumstances it is possible to dispense with a separate muffler and installation space can thus be saved.

In one embodiment of the invention, the reducing agent tank at least partially surrounds the exhaust gas duct. The reducing agent tank preferably has a recess in which the exhaust gas duct extends and which is embodied, for example, in the form of a trough. Likewise it is advantageous to provide the reducing agent tank with a cylindrical bushing so that it can be fitted onto the exhaust gas duct for mounting purposes. The abovementioned embodiments permit a particularly compact design of the exhaust gas treatment system.

In a further embodiment of the invention, the reducing agent tank has a recess for accommodating a reducing agent metering unit. Reducing agent is added to the exhaust gas by the reducing agent metering unit, preferably in predefinable quantities and at times which depend on the engine operating point, via a suitable line and a reducing agent adding device. The structural integration of the reducing agent tank and reducing agent metering unit avoids gaps and protrusions and provides for a compact design with a uniform surface to be obtained.

In still a further embodiment of the invention, the exhaust gas connecting line forms a mixing section for mixing exhaust gas with metered reducing agent. An adding point for the reducing agent is positioned as far upstream as possible on the exhaust gas duct or on a further upstream extension which can be routed into the particle reduction unit. This measure according to the invention provides for a sufficiently long mixing section for mixing and homogenizing exhaust gas and reducing agent in a space-saving fashion.

In a further refinement of the invention, the particle reduction unit, the nitrogen oxide reduction unit and the reducing agent tank are individual modules.

The utility vehicle according to the invention is distinguished by the fact that the associated exhaust gas treatment system is arranged within a predefinable cuboid space envelope. The envelope volume bounds the spatial extent of the exhaust gas treatment system here and is approximately filled by it. The envelope volume can primarily be predefined as a function of the engine class of the utility vehicle and is determined by its dimensions that is length, width and height. However, the positioning of the envelope volume in the utility vehicle itself can preferably also be predetermined. Engine class is to be understood here as a grouping of the utility vehicle engines which is preferably done in accordance with the cubic capacity of the engine and/or rated power. This grouping is preferably also linked to the design of the utility vehicle, for example in terms of number of axles, the overall width, the lateral distance between the longitudinal frame members and/or further classifying features. A particularly simple grouping is obtained by the classification of the engines based on their association with a heavy, medium-sized or lightweight utility vehicle.

In one embodiment of the utility vehicle, the envelope volume extends in the longitudinal direction of the vehicle on the side of a first longitudinal frame member facing away from the longitudinal axis of the vehicle. As a result of this arrangement, the area between the longitudinal support frame members is kept free for other assemblies, in particular for the vehicle drive train.

In another refinement of the utility vehicle, an exhaust gas discharge line which leads away from the exhaust gas treatment system extends to the rear of the utility vehicle. In this embodiment the exhaust gas outlet extends to the side of the utility vehicle pointing toward the center of the roadway. This avoids exhaust gas being emitted in the direction of sidewalks, which is particularly significant in the case of utility vehicles which are used for municipal services.

In a further refinement of the utility vehicle, the side of the envelope volume facing away from the longitudinal axis of the vehicle is disposed at a distance from the adjacent longitudinal frame member which can be determined as a function of an engine class of the utility vehicle. As a result, the width of the envelope volume and thus the maximum width dimension of the exhaust gas treatment system arranged therein is predefined based on the engine class. This is also done in particular with respect to the configuration of the entire width dimension of the utility vehicle, which may be predefined by particular structural or legal requirements.

The exhaust gas treatment system may be mounted on a support structure which can be attached to the first longitudinal frame member. As a result, the longitudinal frame member is utilized to accommodate the exhaust gas treatment system in a stable fashion and to attach it in the utility vehicle. The modules of the exhaust gas treatment system do not need to assume any load-bearing functions themselves and can be of relatively lightweight design. This also facilitates replacement of individual modules.

In still another refinement of the utility vehicle, a fuel tank is arranged next to a second longitudinal frame member of the utility vehicle, on the side of the frame member facing away from the longitudinal axis of the vehicle. The fuel tank is preferably arranged approximately at the level of the exhaust gas treatment system in the longitudinal direction of the vehicle. This arrangement provides a mass distribution of the respective assemblies which is uniform in terms of the common center of gravity.

The invention will be explained in more detail below with reference to the accompanying drawings on the basis associated exemplary embodiments:

DESCRIPTION OF PARTICULAR EMBODIMENTS

Figure 1:
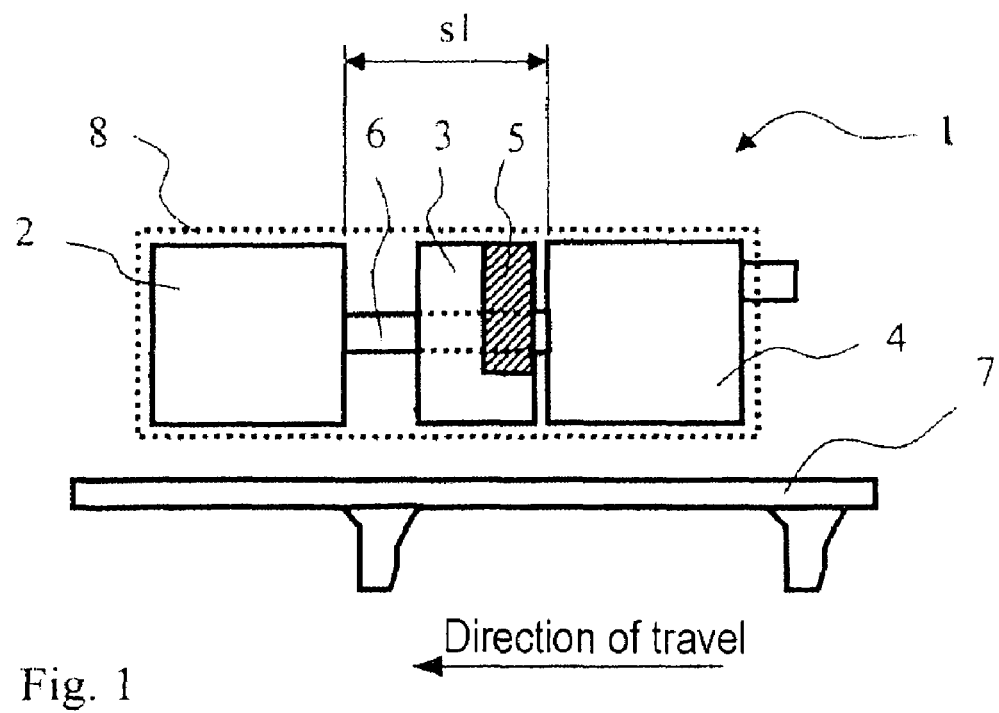
FIG. 1 is a schematic illustration of an embodiment of an exhaust gas treatment system according to the invention.

The exhaust gas treatment system 1 which is illustrated schematically in a plan view in FIG. 1 comprises, in a linear arrangement, a particle reduction unit 2, a reducing agent tank 3 and a nitrogen oxide reduction unit 4. Exhaust gas which has been filtered for the removal of particles is directed to the nitrogen oxide reduction unit 4 from the particle reduction unit 2 via an exhaust gas connecting line 6. The exhaust gas treatment system 1 also has a reducing agent metering unit 5 for metering the reducing agent into the exhaust gas. The entire exhaust gas treatment system 1 is arranged here on the right of a right-hand longitudinal frame member 7 of the utility vehicle viewed in the direction of travel, supported on a supporting structure (not illustrated) which is attached to the longitudinal frame member 7. The exhaust gas treatment system 1 may be arranged at different locations depending on the design of the vehicle. However, for reasons of stability and space an arrangement on a side of a longitudinal frame member facing away from the longitudinal axis of the vehicle is preferred. In these cases, when the exhaust gas treatment system is arranged horizontally the direction of the main flow of the exhaust gas through the exhaust gas treatment system 1. is counter to the direction of travel as indicated in the illustration of FIG. 1.

The particle reduction unit 2, the reducing agent tank 3 and the nitrogen oxide reduction unit 4 are embodied as individual modules, preferably with an essentially cuboid shape and have the same lateral dimensions here. The vertical dimensions of the individual modules 2, 3, 4 are preferably also the same. The individual modules 2, 3, 4 of the exhaust gas treatment system 1 therefore have left-hand and right-hand side faces or upper and lower side faces, each in one plane. The individual modules 2, 3, 4 are detachably integrated in the entire exhaust gas treatment system so that they can be mounted and replaced individually. According to the invention, the particle reduction unit 2 and the nitrogen oxide reduction unit 4 are arranged at a distance s1 from one another. This distance s1 is preferably predefined in such a way that reducing agent tanks 3 which are embodied in different ways may be arranged between the particle and nitrogen reduction units 2, 4. As a result, a kit principle can be implemented for various embodiments of the exhaust gas treatment system 1 with a high proportion of identical parts. This is a particularly effective advantage of the modular design of the exhaust gas treatment system 1.

The entire exhaust gas treatment system 1 is arranged within a cuboid envelope volume 8 whose outlines are represented by dotted lines in FIG. 1. This envelope volume 8 extends in the vicinity of an outer side of a vehicle, in this case to the right of the longitudinal frame member 7 viewed in the direction of travel. The plane in which the side faces which define the envelope volume 8 lie are formed here by the side faces of the particle reduction unit 2 and the nitrogen oxide reduction unit 4. The size and the dimensions of the envelope volume 8 are predefined by the engine class of the utility vehicle in which the exhaust gas treatment system 1 is used. In this context the association of a specific vehicle with an engine class may be determined, for example, by the power of the engine and an engine class may in turn cover a certain engine power range. The length dimension and width dimension of the exhaust gas treatment system 1 or the envelope volume 8 are strictly tailored to the maximum permissible vehicle widths and the distance between the longitudinal frame members as well as to the volume of the modules 2, 3, 4. The overall height of the exhaust gas treatment system 1 or of the envelope volume 8 is strictly determined by the abovementioned variables and the tires of the vehicle as well as the ground clearance provided for the vehicle.

The following table contains typical values for three engine classes MK, based on the engine power P, the volume $V_P$ of the particle reduction unit 2, the volume $V_T$ of the reducing agent tank 3, the volume $V_S$ of the nitrogen oxide reduction unit 4, the length L of the envelope volume 8 and the width B of the envelope volume 8.

| MK | P (kW) | $V_P$ (l) | $V_T$ (l) | $V_S$ (l) | L (mm) | B (mm) |
|---|---|---|---|---|---|---|
| light-weight | 110–170 | 100 | 40 | 100 | 1500 | 600 |
| medium-sized | 180–320 | 150 | 70 | 150 | 1600 | 700 |
| heavy | 260–430 | 180 | 100 | 220 | 1700 | 700 |

The particle reduction unit 2 includes, in its interior, one or more particle filters as a particle-reducing component. The particle filter or filters may be embodied as wall flow filters with a honeycomb shape or as a sintered metal plate filter with a pleated shape. Without restricting the general applicability, the term particle filter is used below even though the particle-reducing component may also be embodied differently from this. If a plurality of individual particle filter elements are arranged in the particle reduction unit 2, these are preferably connected in parallel in terms of flow. In addition, an oxidation catalytic converter is connected upstream of the particle filter in the interior of the particle reduction unit 2. As a result of nitrogen dioxide formed in the oxidation catalytic converter it is also possible, even at comparatively low exhaust gas temperatures, for soot particles which are deposited in the particle filter to be oxidized, allowing the particle filter to be continuously regenerated. In addition, post-oxidation of combustible components contained in the exhaust gas permits the exhaust gas temperature in the oxidation catalytic converter to be effectively raised, for example for the purpose of thermal regeneration of the particle filter. At the same time, the oxidation catalytic converter may comprise a plurality of elements which are connected in parallel flow arrangement.

Exhaust gas which is cleaned of particles is passed on to the nitrogen oxide reduction unit 4 via the exhaust gas connecting line 6. The nitrogen oxide reduction unit 4 includes, in its interior, one or more denox catalytic converter elements. Without restricting the general applicability, it is assumed below that this is what is referred to as an SCR catalytic converter which, in the presence of ammonia as a reducing agent, can catalyze the conversion of nitrogen oxides contained in the exhaust gas to nitrogen. If a plurality of SCR catalytic converter elements are arranged in the nitrogen oxide reduction unit 4, they are preferably connected in parallel. Since a solution of water and urea is preferably used as the ammonia-splitting reducing agent, a hydrolysis catalytic converter may be connected upstream of the SCR catalytic converter, which enhances the release of ammonia and which is arranged in the nitrogen oxide reduction unit 4.

Figure 2:
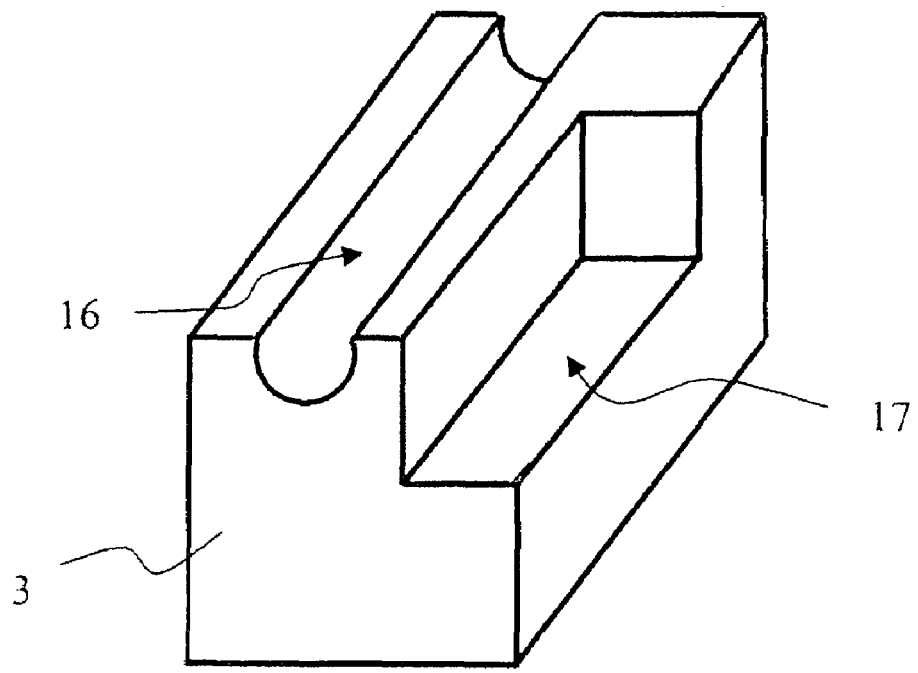
FIG. 2 is a schematic illustration of an embodiment of a reducing agent tank as a component of the exhaust gas treatment system.

FIG. 2 illustrates an embodiment of the reducing agent tank 3 which is arranged between the particle reduction unit 2 and the nitrogen oxide reduction unit 4, and which is explained with reference to the components illustrated in FIG. 1. The reducing agent tank 3 as shown herein has a trough-shaped recess 16 in which the exhaust gas connecting line 6 extends. Of course, the exhaust gas connecting line 6 may however also extend through the reducing agent tank 3. As a result, on the one hand a compact design is obtained and on the other hand good heat transfer between the exhaust gas connecting line 6 and the reducing agent is ensured so that it is prevented from freezing up or rapid thawing of entirely or partially frozen reducing agent is achieved. An excessively high flow of heat to the reducing agent or the wall of the reducing agent tank 3 can in turn be avoided by means of a suitable thermal insulating means. The reducing agent metering unit 5 can be arranged outside the envelope volume 8. However it is also advantageous to if the latter is spatially integrated into the reducing agent tank 3, for which purpose the reducing agent tank 3 has a corresponding recess 17.

The reducing agent metering unit 5 is actuated via a control unit (not illustrated) in such a way that reducing agent can be metered into the exhaust gas line as required. For this purpose, the reducing agent metering unit 5 preferably has a suitable pump with which reducing agent is fed via a line system to a metering valve via which the reducing agent is added to the exhaust gas. The adding of the reducing agent to the exhaust gas takes place at a point which is so far upstream of the nitrogen oxide reduction unit 4 or of the SCR catalytic converter that sufficient mixing and preparation of the reducing agent can take place. The exhaust gas connecting line 6 serves for this purpose as a mixing section for the added reducing agent. The length of the mixing section is approximately 1 m. In order to achieve this length, the exhaust gas connecting line 6 may have an extension which runs inside the particle reduction unit 2 and/or the nitrogen oxide reduction unit 4.

The particle reduction unit 2 and the nitrogen oxide reduction unit 4 which are illustrated in FIG. 1 each have a volume of approximately 100 l. Such an exhaust gas treatment system 1 is thus associated with a lightweight engine class.

Figure 3:
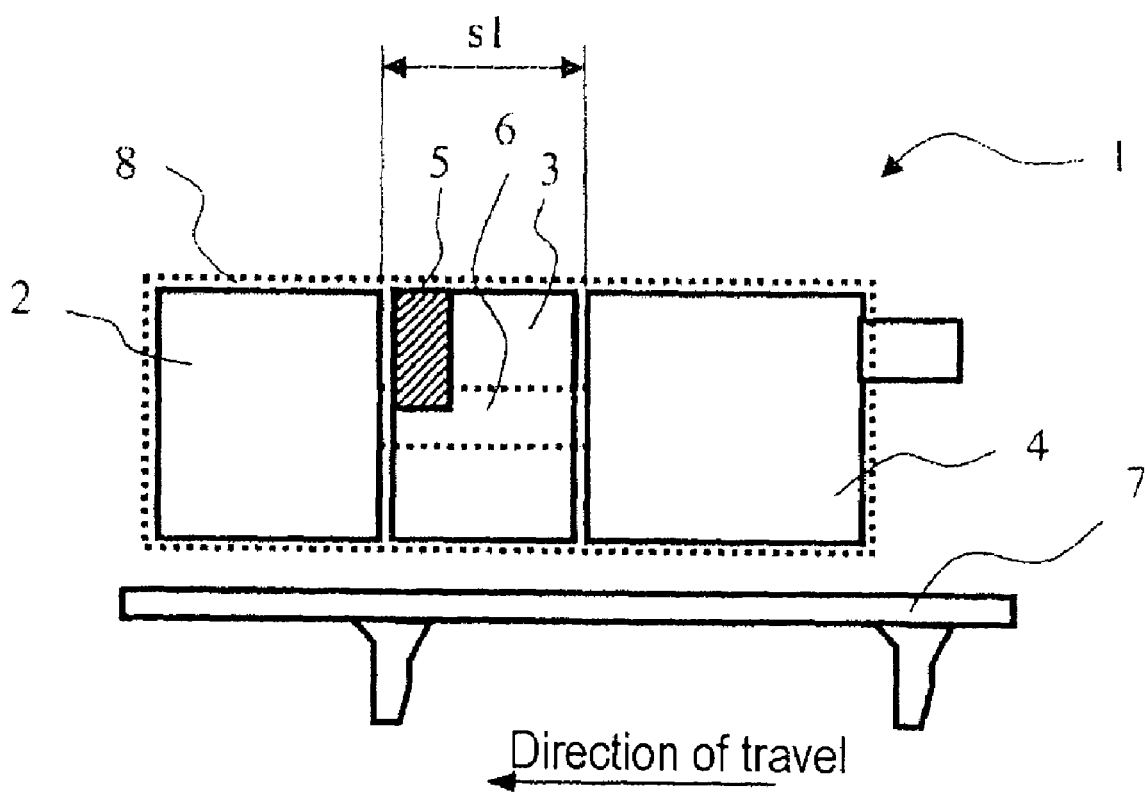
FIG. 3 is a schematic illustration of a second embodiment of the exhaust gas treatment system according to the invention.

FIG. 3 shows a further embodiment of the exhaust gas treatment system 1 according to the invention which is similar to the embodiment illustrated in FIG. 1, but is associated with a heavier engine class. Components with analog functions are provided with the same reference symbols.

In contrast to the embodiment illustrated in FIG. 1, the reducing agent tank 3 is has a length of only slightly less than s1 (FIG. 3), i.e. only insignificantly less than the predefined distance between the particle reduction unit 2 and nitrogen oxide reduction unit 4, and is thus larger. The reducing agent tank 3 therefore adjoins these units closely at the front end or rear end. As a result, the exhaust gas treatment system 1 fills a relatively large portion of the envelope volume 8 and the effective outer surface is reduced further. Depending on the association with a relatively heavy engine class, the particle reduction unit 4 with approximately 180 l and the nitrogen oxide reduction unit 2 with approximately 220 l have a larger volume compared to the embodiment illustrated in FIG. 1. Correspondingly, the envelope volume 8 is also larger and preferably has a larger width.

Figure 4:
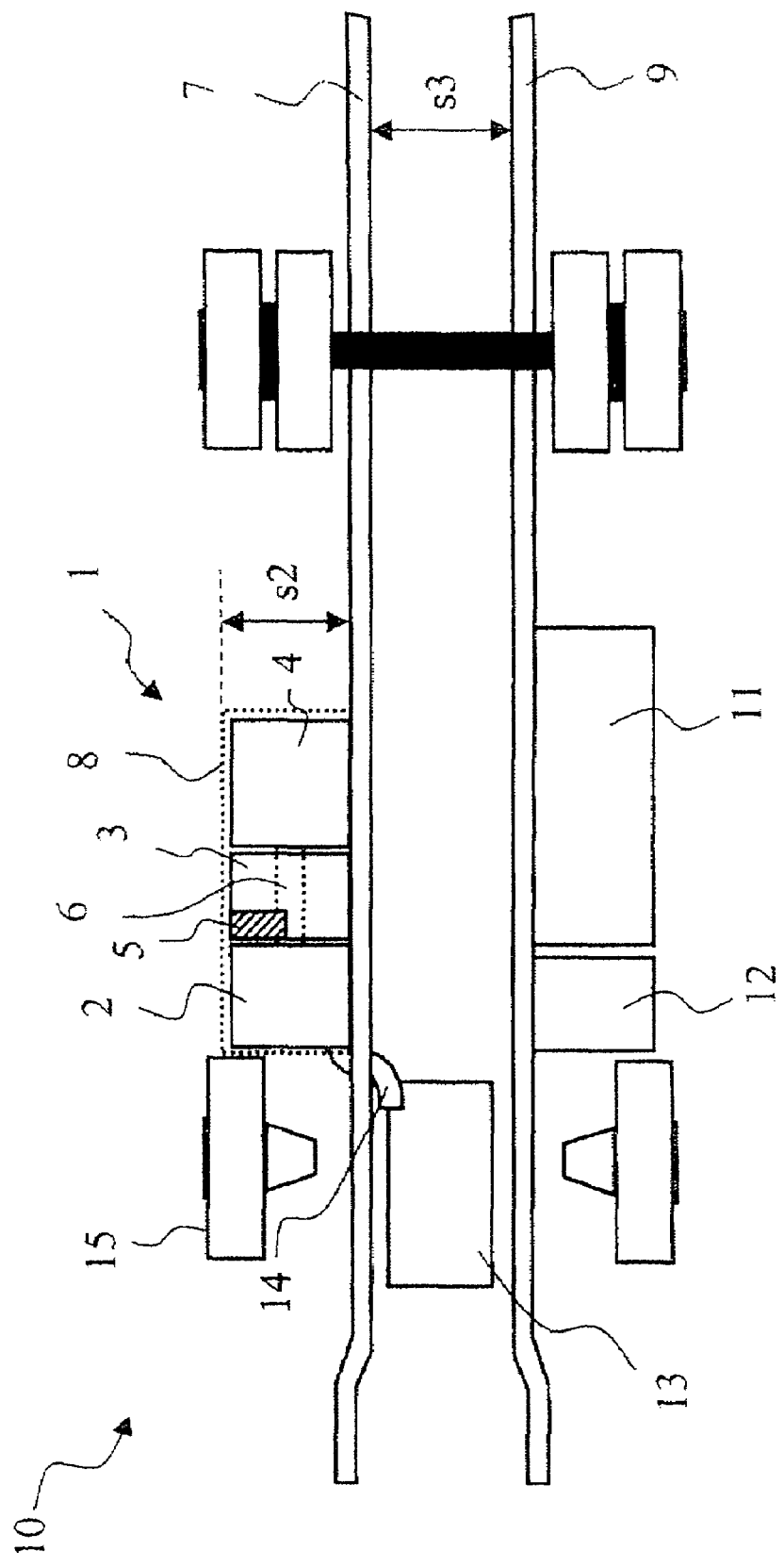
FIG. 4 is a schematic illustration of an embodiment of a utility vehicle according to the invention.

The design of a utility vehicle 10 of a heavy engine class is illustrated in FIG. 4. Here, the corresponding components in FIG. 1 and FIG. 2 are designated using the same reference symbols. The exhaust gas treatment system 1 is arranged on the outside to the side of the right-hand longitudinal frame member 7, viewed in the direction of travel. The fuel tank 11 and the vehicle battery 12 are arranged on the outside of the opposite longitudinal frame member 9. As a result of this arrangement of the relatively heavy components 1, 11, 12 it is ensured that the center of gravity of the utility vehicle 10 is disposed approximately on the longitudinal axis of the vehicle, which improves the driving behavior. The exhaust gas treatment system 1 is embodied as illustrated in FIG. 2.

The engine 13 of the utility vehicle 10 is an in-line engine. The exhaust gas outlet of the engine is directed to the side of the vehicle on which the exhaust gas treatment system 1 is also arranged. An exhaust gas turbocharger (not illustrated) is arranged in the exhaust gas outlet line of the engine 13. For the exhaust gas which is directed from the exhaust gas turbocharger outlet to the particle reduction unit 2 an exhaust gas duct 14 is provided with the shortest possible length in order to avoid heat losses as far as possible. Consequently, placing of the envelope volume 8 is predefined in such the exhaust gas treatment system 1 is arranged as closely as possible behind the front wheel 15 of the utility vehicle 10 in the direction of travel. The lateral extent of the envelope volume 8 is determined by the longitudinal frame member 7 by the distance s2 from its right-hand side face viewed in the direction of travel. The distance s2 is in turn mainly determined by the distance s3 between the longitudinal frame members 7, 9 and by the maximum permissible vehicle width.

The exhaust gas which is derived from the exhaust gas treatment system 1 is discharged to the ambient of the vehicle via an exhaust gas outlet line (not illustrated). This exhaust gas outlet line preferably leads to the side of the vehicle which is directed to the center of the roadway, i.e. usually to the left-hand side of the vehicle. However, the exhaust gas outlet line can also be of different design and may extend, for example, to the front on the right-hand side and then on in a vertically upward direction so that the exhaust gas is directed vertically upwardly.

The invention claimed is:

1. An exhaust gas treatment system for a utility vehicle, said system comprising:
    a particle reduction unit,
    a nitrogen oxide reducing agent tank for storing a nitrogen oxide reducing agent
    a nitrogen oxide reduction unit arranged downstream of the particle reduction unit and the nitrogen oxide reducing tank, and
    an exhaust gas connecting line extending from the particle reduction unit to the nitrogen oxide reduction unit, said particle reduction unit, said nitrogen oxide reducing agent tank and said nitrogen oxide reduction unit being arranged linearly one after the other for supplying a nitrogen oxide reducing agent to the nitrogen oxide reduction unit said nitrogen oxide reducing agent tank being disposed in heat exchange relationship with said exhaust gas connecting line for transferring heat to the nitrogen oxide reducing agent tank at low ambient temperatures to permit supplying nitrogen oxide reducing agent to the nitrogen oxide reduction unit in order to reduce the nitrogen oxide content of the exhaust gas of the utility vehicle.

2. The exhaust gas treatment system as claimed in claim 1, wherein the nitrogen oxide reducing agent tank at least partially surrounds the exhaust gas connecting line.

3. The exhaust gas treatment system as claimed in claim 1, wherein the nitrogen oxide reducing agent tank has a recess in which a reducing agent metering unit is accommodated.

4. The exhaust gas treatment system as claimed in claim 1, wherein the exhaust gas connecting line forms a mixing section for mixing exhaust gas and the reducing agent added to the exhaust gas.

5. The exhaust gas treatment system as claimed in claim 1, wherein the particle reduction unit, the nitrogen oxide reduction unit and the reducing agent tank are separate components of the exhaust gas treatment system arranged closely adjacent one another.

6. A utility vehicle having longitudinally extending first and second spaced support frame members and an exhaust gas treatment system arranged along the first frame member at the side thereof facing away from the second frame member, said exhaust gas system, comprising:
    a particle reduction unit,
    a nitrogen oxide reducing agent tank for storing a nitrogen oxide reducing agent,
    a nitrogen oxide reduction unit arranged downstream of the particle reduction unit and the nitrogen oxide reducing tank, all disposed in a linear arrangement one after the other, and
    an exhaust gas connecting line extending from the particle reduction unit to the nitrogen oxide reduction unit, said nitrogen oxide reduction unit being arranged at a distance from the particle reduction unit and the nitroyan oxide reducing agent tank for supplying a reducing agent connected to the nitrogen oxide reduction unit for reducing the nitrogen oxide being arranged in heat exchange relationship with the exhaust gas line between the particle reduction unit and the nitrogen oxide reduction unit, said exhaust gas treatment system being disposed within a predefined, cuboid envelope volume.

7. The utility vehicle as claimed in claim 6, wherein said exhaust gas treatment system mounted to a first longitudinal frame member is disposed on the side of the first frame member in an envelope volume extending in the longitudinal direction of the vehicle along the first frame member.

8. The utility vehicle as claimed in claim 6, wherein an exhaust gas outlet line which leads away from the exhaust gas treatment system extends to the side of the utility vehicle opposite the exhaust gas treatment system.

9. The utility vehicle as claimed in claim 6, wherein the side of the envelope volume facing away from the longitudinal axis of the vehicle is disposed at a distance from the first longitudinal frame member which depends on an engine class to which the utility vehicle is assigned.

10. The utility vehicle as claimed in claims 6, wherein the exhaust gas treatment system is disposed on a support structure which is attached to the first longitudinal frame member.

11. The utility vehicle as claimed in claim 10, wherein a fuel tank is arranged next to the second longitudinal frame member of the utility vehicle, on the side of the second longitudinal frame member facing away from the longitudinal axis of the vehicle.

12. The utility vehicle as claimed in claim 4, wherein the mixing section has a length of about 1 m.

13. The utility vehicle as claimed in claim 1, wherein the reduction agent stored in the nitrogen oxide reducing agent tank is an urea-water solution.

14. The utility vehicle as claimed in claim 13, wherein the particle reducing unit comprises a particle filter and an oxidation catalytic converter arranged upstream of the particle filter.

15. The utility vehicle as claimed in claim 13, wherein the nitrogen oxide reducing unit includes a Denox catalytic converter in the form of an SCR catalytic converter.

16. The utility vehicle as claimed in claim 6, wherein the utility vehicle includes a fuel tank which is mounted to the second frame member at the side thereof facing away from the first frame member.

17. The utility vehicle as claimed in claim 6, wherein the utility vehicle includes a battery whicb is supported by the second trame member of the side thereof facing away from the first frame member.

* * * * *